US007051645B2

(12) United States Patent
Schenkel et al.

(10) Patent No.: US 7,051,645 B2
(45) Date of Patent: May 30, 2006

(54) PISTON FOR AN ENGINE

(75) Inventors: Jerry L. Schenkel, Pewaukee, WI (US); Jeffrey H. Whitmore, Shorewood, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 10/881,928

(22) Filed: Jun. 30, 2004

(65) Prior Publication Data

US 2006/0000351 A1 Jan. 5, 2006

(51) Int. Cl.
*F16J 1/04* (2006.01)

(52) U.S. Cl. .................................................... 92/223

(58) Field of Classification Search .................. 92/223; 427/425, 427, 427.3, 455, 456
See application file for complete search history.

(56) References Cited

U.S. PATENT DOCUMENTS

| | | | | | |
|---|---|---|---|---|---|
| 2,817,562 | A | * | 12/1957 | Fleming et al. | 92/223 |
| 3,723,165 | A | | 3/1973 | Longo et al. | |
| 3,935,797 | A | * | 2/1976 | Niimi et al. | 92/223 |
| 3,947,607 | A | | 3/1976 | Gazzard et al. | |
| 4,018,949 | A | * | 4/1977 | Donakowski et al. | 427/427 |
| 4,196,237 | A | | 4/1980 | Patel et al. | |
| 4,218,494 | A | | 8/1980 | Belmondo et al. | |
| 4,230,749 | A | | 10/1980 | Patel | |
| 4,263,353 | A | | 4/1981 | Patel | |
| 4,370,788 | A | | 2/1983 | Baker | |
| 4,788,402 | A | | 11/1988 | Browning | |
| 4,928,879 | A | | 5/1990 | Rotolico | |
| 4,987,865 | A | * | 1/1991 | Schenkel | 92/223 |
| 5,080,056 | A | * | 1/1992 | Kramer et al. | 92/223 |
| 5,088,285 | A | | 2/1992 | Stevenson | |
| 5,147,999 | A | | 9/1992 | Dekumbis et al. | |
| 5,158,430 | A | | 10/1992 | Dixon et al. | |
| 5,183,014 | A | | 2/1993 | Stevenson | |
| 5,191,186 | A | | 3/1993 | Crapo, III et al. | |
| 5,268,045 | A | | 12/1993 | Clare | |
| 5,271,967 | A | | 12/1993 | Kramer et al. | |
| 5,296,667 | A | | 3/1994 | Marantz et al. | |
| 5,302,450 | A | | 4/1994 | Rao et al. | |
| 5,315,970 | A | | 5/1994 | Rao et al. | |
| 5,322,753 | A | | 6/1994 | Tamura et al. | |
| 5,333,536 | A | * | 8/1994 | Yuda | 29/888.048 |
| 5,334,235 | A | | 8/1994 | Dorfman et al. | |
| 5,352,538 | A | | 10/1994 | Takeda et al. | |
| 5,358,753 | A | | 10/1994 | Rao et al. | |
| 5,363,821 | A | | 11/1994 | Rao et al. | |
| 5,380,564 | A | | 1/1995 | VanKuiken, Jr. et al. | |
| 5,405,659 | A | | 4/1995 | Fernandez | |
| 5,435,872 | A | * | 7/1995 | Penrice | 92/223 |
| 5,442,153 | A | | 8/1995 | Marantz et al. | |
| 5,449,536 | A | | 9/1995 | Funkhouser et al. | |
| 5,450,784 | A | * | 9/1995 | Shureb | 92/223 |
| 5,453,329 | A | | 9/1995 | Everett et al. | |
| 5,466,906 | A | | 11/1995 | McCune, Jr. et al. | |
| 5,468,295 | A | | 11/1995 | Marantz et al. | |

(Continued)

*Primary Examiner*—Thomas E. Lazo
(74) *Attorney, Agent, or Firm*—Michael Best & Friedrich, LLP

(57) ABSTRACT

A piston for use in an engine. The piston includes a piston head having at least one ring groove. The piston also includes a piston skirt coated with a first thickness of a bronze coating material, and a side panel adjacent the piston skirt that is coated with a second thickness of the bronze coating material. The first and second thicknesses of the bronze coating material are different. In some embodiments, the bronze coating material also includes aluminum.

61 Claims, 3 Drawing Sheets

U.S. PATENT DOCUMENTS

| | | | | |
|---|---|---|---|---|
| 5,477,820 | A | 12/1995 | Rao | |
| 5,528,010 | A | 6/1996 | Herwig et al. | |
| 5,581,881 | A | 12/1996 | Sherman et al. | |
| 5,592,927 | A | 1/1997 | Zaluzec et al. | |
| 5,622,753 | A | 4/1997 | Shepley et al. | |
| 5,626,674 | A | 5/1997 | VanKuiken, Jr. et al. | |
| 5,685,267 | A | 11/1997 | Wiczynski et al. | |
| 5,723,187 | A | 3/1998 | Popoola et al. | |
| 5,743,012 | A | 4/1998 | Adams et al. | |
| 5,766,693 | A | 6/1998 | Rao | |
| 5,796,064 | A | 8/1998 | Rice et al. | |
| 5,808,270 | A | 9/1998 | Marantz et al. | |
| 5,820,938 | A | 10/1998 | Pank et al. | |
| 5,837,960 | A | 11/1998 | Lewis et al. | |
| 5,884,600 | A * | 3/1999 | Wang et al. | 92/223 |
| 5,908,670 | A | 6/1999 | Dunkerley et al. | |
| 5,938,944 | A | 8/1999 | Baughman et al. | |
| 5,958,521 | A | 9/1999 | Zaluzec et al. | |
| 5,958,522 | A | 9/1999 | Nakagawa et al. | |
| 5,968,604 | A | 10/1999 | Bischoff-Bogon et al. | |
| 6,001,426 | A | 12/1999 | Witherspoon et al. | |
| 6,089,828 | A | 7/2000 | Hollis et al. | |
| 6,095,107 | A | 8/2000 | Kloft et al. | |
| 6,124,563 | A | 9/2000 | Witherspoon et al. | |
| 6,124,564 | A | 9/2000 | Sue et al. | |
| 6,158,963 | A | 12/2000 | Hollis et al. | |
| 6,159,554 | A | 12/2000 | Kloft et al. | |
| 6,267,558 | B1 | 7/2001 | Dingwell et al. | |
| 6,280,796 | B1 | 8/2001 | Kloft et al. | |
| 6,322,857 | B1 | 11/2001 | Kretschmer et al. | |
| 6,322,902 | B1 | 11/2001 | Takayama et al. | |
| 6,345,440 | B1 | 2/2002 | Van Reatherford et al. | |
| 6,367,151 | B1 | 4/2002 | Schlegel et al. | |
| 6,379,754 | B1 | 4/2002 | Schlegel et al. | |
| 6,495,267 | B1 * | 12/2002 | Schenkel | 29/888.044 |
| 6,513,238 | B1 | 2/2003 | Schlegel | |
| 6,544,597 | B1 | 4/2003 | Takahashi et al. | |
| 6,560,869 | B1 | 5/2003 | Schlegel et al. | |
| 6,600,130 | B1 | 7/2003 | Aram et al. | |
| 6,602,762 | B1 | 8/2003 | Hwan et al. | |
| 2002/0018858 | A1 | 2/2002 | Takahashi et al. | |
| 2002/0025386 | A1 | 2/2002 | Heinemann et al. | |
| 2003/0140885 | A1 | 7/2003 | Grassi | |
| 2003/0164150 | A1 | 9/2003 | Barbezat | |

* cited by examiner

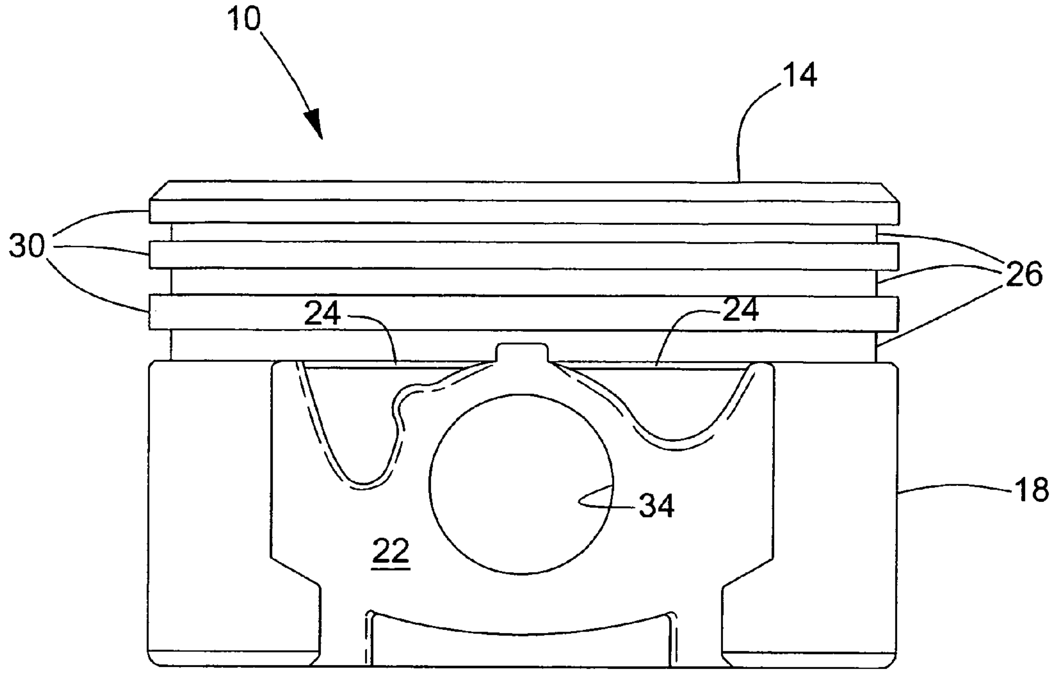
FIG. 3
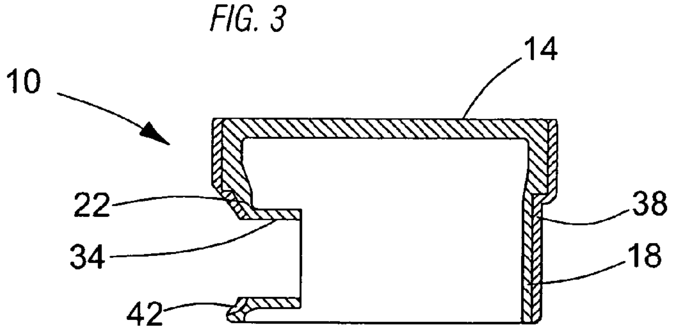
FIG. 4A
FIG. 4
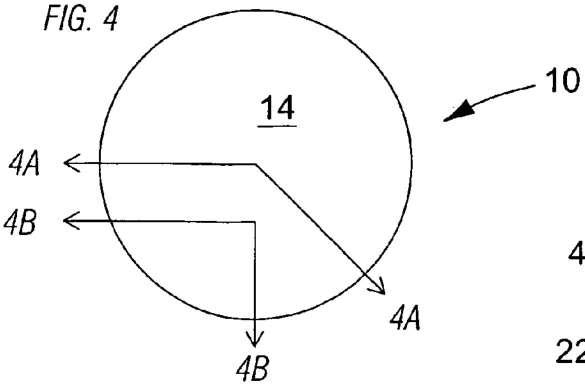
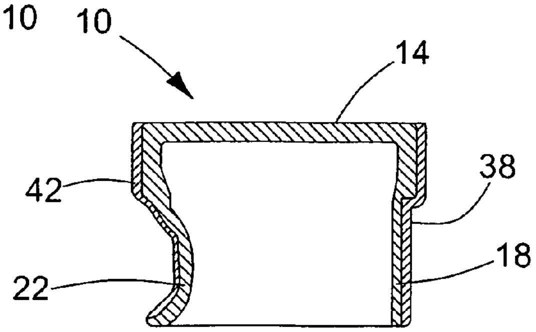
FIG. 4B

PISTON FOR AN ENGINE

FIELD OF THE INVENTION

This invention relates to a piston for use in an engine. More specifically, the invention relates to a coated piston for use in an engine.

BACKGROUND OF THE INVENTION

Typical engines, such as internal combustion engines, include at least one piston that reciprocates within a cylinder of the engine. The piston includes a head portion, a skirt, and at least one side panel. The head portion usually includes at least one piston ring groove for receiving a piston ring therein.

The piston is generally sized to be just smaller in overall diameter than the diameter of the cylinder in which the piston reciprocates. This allows the piston to move within the cylinder while minimizing the noise in the engine. When too much space exists between the piston and cylinder, a disruptive noise, commonly known as piston slap, can occur as the piston moves within the cylinder. It is desirable to reduce the amount of piston slap that occurs within the engine.

When the piston moves within the cylinder, some of the piston surfaces can rub against the inner surface of the cylinder, especially when the tolerances between the size of the piston and the diameter of the cylinder are very close. Many engines are cast from an aluminum alloy, which provides a lightweight but strong engine housing. When the piston is cast from the same material as the engine housing (and thus, the same material as the cylinder), scuffing can occur between the surfaces of the piston and the cylinder, thereby decreasing the life of the piston, increasing the piston slap, and also increasing emissions. It is therefore desirable to provide a bearing surface on either the cylinder or the piston that will reduce the wear on the piston.

SUMMARY OF THE INVENTION

The piston according to the present invention includes a piston head including at least one ring groove and a piston skirt coated with a first thickness of a bronze coating material. The piston also includes a side panel adjacent the piston skirt that is coated with a second thickness of the bronze coating material such that the first and second thicknesses of bronze coating material are different.

In one embodiment, the bronze coating material includes aluminum-bronze. The aluminum-bronze includes at least about seven percent aluminum and less than or equal to about thirty percent aluminum. In another embodiment, the first thickness of coating is greater than the second thickness. In another embodiment, the second thickness of bronze coating material on the side panel is a non-uniform thickness.

The present invention also includes a method of making a piston. The method includes casting a piston having a piston head, a piston skirt, and a side panel such that the piston skirt has a smaller diameter than the piston head. The method also includes applying a coating material to the piston skirt, and machining the piston only after the coating is applied such that the diameter of the piston skirt after machining is greater than or equal to the diameter of the piston head.

Further constructions and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show some embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

FIG. 3 is a side view similar to FIG. 2, illustrating the side panel.

FIG. 4 is a top view of the piston of FIG. 2.

FIG. 4A is a section view of the piston taken along line 4A—4A of FIG. 4.

FIG. 4B is a section view of the piston taken along line 4B—4B of FIG. 4.

DETAILED DESCRIPTION

Figure 1:
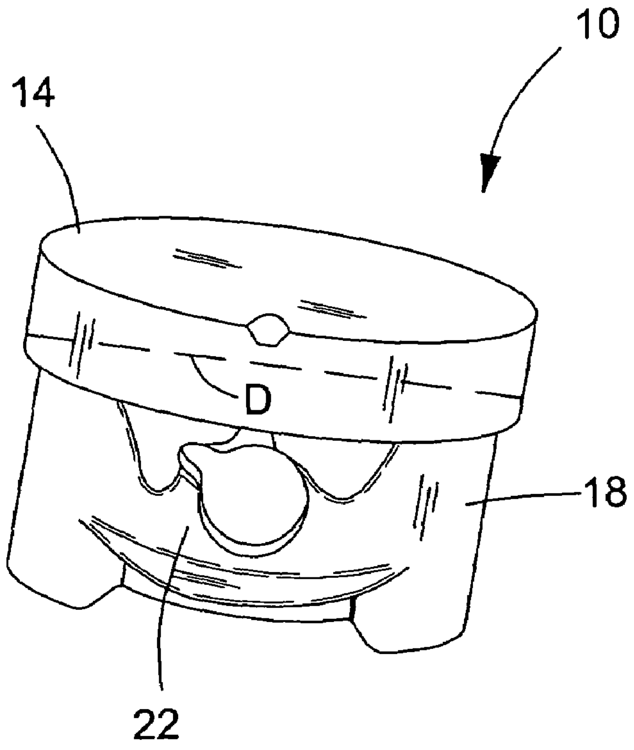
FIG. 1 is a perspective view of a piston according to the present invention, shown as cast.

FIG. 1 illustrates a piston 10 according to the present invention. The piston 10 is formed, such as by casting, from any number of known aluminum alloys. The formed piston is also known as a piston blank. The piston 10 includes a piston head 14, a piston skirt 18, and a side panel 22 adjacent the skirt 18. As illustrated in FIG. 1, the skirt 18 and side panel 22 are stepped down in diameter from the diameter D of the piston head 14 as cast. The amount of step down is preferably between 0.025 inches and 0.050 inches. Once the piston 10 is cast, the piston 10 is then grit-blasted, for example, with silica grit, to clean the surfaces of the piston 10 and prepare the piston 10 for coating. The piston 10 also includes a land 24 adjacent the side panel 22.

Figure 2:
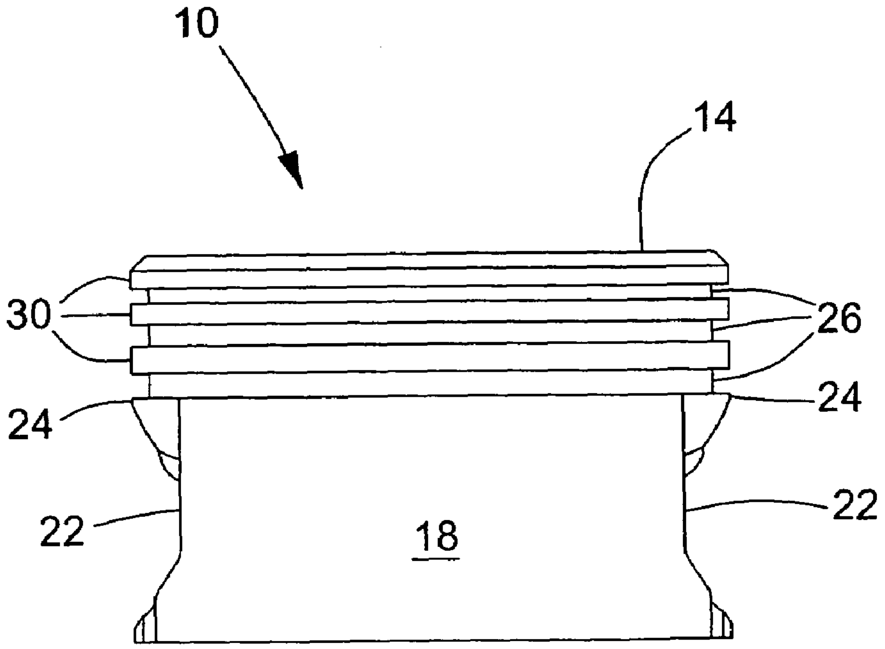
FIG. 2 is side view of the piston of FIG. 1 after coating and machining, illustrating the piston skirt.

FIG. 2 illustrates the piston 10 after it has been coated and machined. As shown in FIG. 2, the piston head 14 includes three ring grooves 26 and lands 30 between the grooves 26. It is understood that in other embodiments, any desired number of ring grooves could be machined in the piston head, depending on the type of engine the piston will be used for. FIG. 3 also illustrates the coated and machined piston 10, showing the side panel 22 and the land 24 in more detail. As shown in FIG. 3, the piston 10 also includes an aperture 34, the function of which will be described in more detail below with respect to FIG. 5.

The piston 10 illustrated in FIGS. 2 and 3 is coated with a bronze coating material. Bronze is generally defined as a copper-based alloy that often includes tin, antimony, or phosphorous, in addition to other trace metals. The bronze coating material in the illustrated embodiment is an aluminum-bronze material. However, it is understood that in other embodiments, other types of bronze materials, including but not limited to manganese-bronze, silicon-bronze, or zinc-bronze, could be used and still fall within the scope of the present invention.

Coating the aluminum piston 10 with a bronze coating material creates a piston surface that resists scuffing. When an aluminum piston reciprocates within an aluminum cylinder bore of an engine, the piston surfaces can rub against the cylinder bore and scuff, reducing the life of the piston, increasing the noise produced by the engine due to piston slap, and increasing the exhaust emissions of the engine. Adding the aluminum to the bronze coating material softens the bronze and helps the bronze coating material bond to the aluminum piston. However, if too much aluminum is added to the bronze coating material, the bronze coating begins to act more like aluminum, increasing the possibility of scuffing the piston, which can increase engine emissions. In addition, an aluminum-aluminum interface can cause the engine to seize at high temperatures. The aluminum-bronze material used in the present invention includes at least about seven percent aluminum and less than or equal to about thirty percent aluminum. In one embodiment, the aluminum-bronze material includes about fourteen percent aluminum.

FIGS. 4–4B illustrate the coating material on the piston 10. With reference to FIGS. 4A and 4B, the piston skirt 18 is coated with a first thickness 38 of the bronze coating material. The first thickness 38 of the bronze coating is greater than or equal to 0.002 inches and is less than or equal to 0.030 inches. In one embodiment, the first thickness 38 of bronze coating material is between 0.022 inches and 0.025 inches. The side panel 22 is coated with a second thickness 42 of the bronze coating material. The second thickness 42 is preferably less than the first thickness 38 and is greater than or equal to zero and less than or equal to 0.028 inches. Thus, in some embodiments, the side panel 22 includes no coating material. As illustrated in FIG. 4B, the second thickness 42 on the side panel 22 is a uniform thickness. However, it is understood that in other embodiments, the second thickness 42 can be a non-uniform thickness across the side panel 22.

Figure 5:
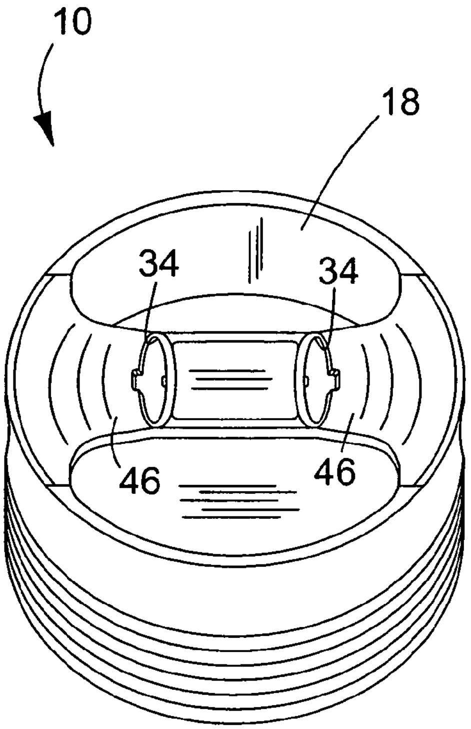
FIG. 5 is a bottom perspective view of the piston of FIG. 2.

FIG. 5 illustrates the bottom of the piston 10. As mentioned above, the piston 10 includes an aperture 34. The aperture 34 is configured to receive a connecting pin (not shown) that connects the piston 10 to a connecting rod (not shown). The connecting rod is connected to the crankshaft of the engine. The piston 10 also includes at least one pin boss 46 disposed radially inwardly of the side panel 22. The aperture 34 extends through the pin boss 46.

The piston 10 is made according to the following method. The piston 10 is cast from an aluminum alloy such that the piston skirt 18 has a smaller diameter than the piston head 14 (see FIG. 1). After casting, the piston 10 is cleaned and prepared to receive a coating, such as by grit blasting the piston 10 with silica grit. Grit blasting the piston 10 roughens the surfaces of the piston 10, which can improve the mechanical bond between the bronze coating material and the aluminum surfaces of the piston 10.

Figure 6:
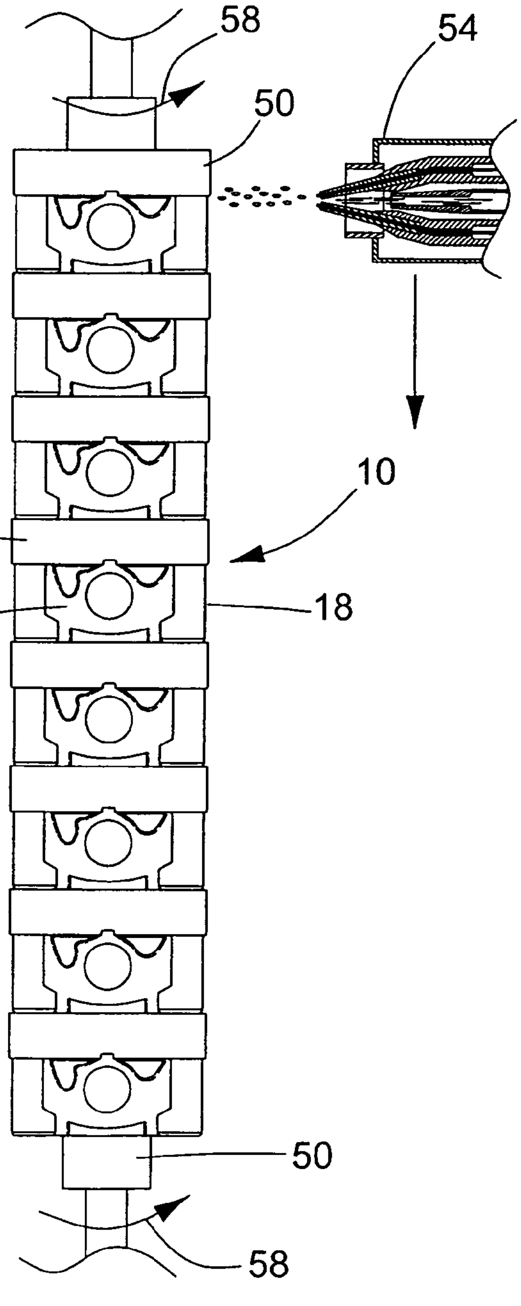
FIG. 6 is a side view showing a plurality of the pistons of FIG. 1 during the coating process.

Once the piston 10 is cast and blasted, a number of pistons 10 are clamped together axially by a clamping mechanism 50, as illustrated in FIG. 6, so that the bronze coating material can be sprayed onto the pistons 10. The bronze coating material is in the form of two wires that are melted and sprayed onto the surfaces of the pistons 10 using a conventional two-wire arc spraying apparatus 54. In the illustrated embodiment, both wires in the spraying apparatus 54 are an aluminum-bronze alloy. However, in other embodiments, it is possible to use two wires of different compositions in the spraying apparatus 54 that, when melted together, form the desired coating material. One such spraying apparatus is disclosed in U.S. Pat. No. 6,663,013, which is incorporated by reference herein, and is available from Thermach, Inc. of Hortonville, Wis.

The spraying apparatus 54 can use between one hundred twenty amps and three hundred sixty amps of current, and preferably uses between two hundred fifty and three hundred amps of current. The more power supplied to the spraying apparatus, the faster the bronze wire can be fed through the spraying apparatus 54, and thus the faster the coating process. However, when more than three hundred amps is used, the spraying apparatus 54 begins to vaporize the bronze wire, reducing the efficiency of the spraying apparatus 54.

In the embodiment illustrated in FIG. 6, the pistons 10 are rotated by the clamping mechanism 50 in the direction of arrow 58, and the spraying apparatus 54 reciprocates past the pistons 10 to spray the pistons 10 as they are rotated. However, it is understood that in other embodiments, the clamping mechanism 50 could reciprocate the pistons 10 axially as well as rotating the pistons 10 with the spraying apparatus 54 remaining stationary. In other embodiments, the pistons 10 can be clamped in a stationary position and the spraying apparatus 54 can be moved to coat the pistons 10. In still other embodiments, more than one spraying apparatus 54 could be used to coat the pistons 10.

Depending on how much current is used by the spraying apparatus 54, the piston 10 is heated as the spraying apparatus 54 deposits the molten bronze coating material on the piston surfaces. Moving the spraying apparatus 54 closer to the pistons 10 during spraying can also result in an increase in heating of the pistons 10 as they are coated. If the pistons 10 get too hot during coating, the adhesion between the bronze coating material and the piston 10 decreases. The temperature of the molten bronze material is around 1000 degrees Fahrenheit. It is desirable to keep the temperature of the pistons 10 between one hundred eighty degrees and two hundred thirty degrees Fahrenheit during spraying to ensure a strong bond between the pistons 10 and the coating material. The temperature of the piston 10 can be controlled by adjusting the distance between the spraying apparatus 54 and the pistons 10 during coating, or by adjusting the power to the spraying apparatus 54.

The bronze coating is most useful on the piston skirt 18 because it is the surface of the piston skirt 18 that contacts the cylinder bore surface. Any bronze coating on the side panels 22 or the piston head 14 is thus extraneous and it is desirable in some embodiments to reduce or even eliminate the amount of bronze coating material on the side panels 22. This reduction can be accomplished in several ways. In one embodiment, the pistons 10 clamped so that the piston skirt 18 is fully coated and then the pistons 10 are rotated quickly so that a minimal amount of coating is deposited on the side panel 22, and the rotation is slowed again when the other piston skirt 18 is exposed to the bronze coating material. This results in a greater thickness of bronze coating material on the piston skirt 18 than the side panel 22. In other embodiments, the side panel 22 and/or the piston head 14 could be masked such that no bronze coating material is deposited on the side panel 22 or the piston head 14. The bronze coating material could then be recovered from the masking element and reused by the spraying apparatus 54. However, it is understood that in other embodiments, the layer of bronze coating on the side panels 22 could be greater than or equal to the thickness of bronze coating material on the piston skirt 18. In yet other embodiments, the spray angle of the nozzle of the spraying apparatus 54 could be narrowed, reducing the spray path of the spraying apparatus 54 which would make it easier to control where on the piston the bronze coating material was being sprayed.

Once the piston 10 is coated, the piston 10 is then machined. Machining the piston 10 smoothes the surfaces of the piston 10 and shapes the piston 10 so that it can move within the cylinder bore. The machined piston 10 of the illustrated embodiment is slightly oval in shape. After machining, the diameter of the piston skirt 18 is greater than or equal to the diameter of the piston head. Machining the piston 10 also includes creating at least one ring groove 26 in the piston head 14. When more than one ring groove 26 is created, the machining process also creates lands 30 between the ring grooves 26. The ring grooves 26 are designed to accept piston rings (not shown). Creating the ring grooves 26 after the coating process will remove any bronze coating material from the piston head 14. Machining the piston 10 also removes any bronze coating material from the lands 24 adjacent the side panel 22. In some embodiments, it may be desirable to include some bronze coating material on the surfaces of the piston head 14 or the lands 24. In those embodiments, the machining process does not remove all of the bronze coating material from those surfaces.

In pistons that are gravity cast and/or pistons that are coated with a material using a plating process, the piston is machined before the coating is applied. This may lead to some undesirable results. First, applying the plating to the piston head 14 after machining (and thus after the ring grooves 26 are formed) may allow excess plating to build up on the edges of the ring grooves 26, creating an antenna or "dog-bone" effect (as the edges of the ring grooves 26 act as an antenna, attracting more of the plating material to those positions). This can affect how the piston rings fit into the ring grooves 26, can increase the noise or piston slap within the engine, and can increase the amount of exhaust emissions from the engine. Second, applying the plating to the piston 10 after machining can further increase the noise and exhaust emissions produced by the engine because of greater tolerance variations on the piston. For example, a piston may include a 0.0005 inch tolerance on the pin boss 46, a 0.0005 inch tolerance on the piston skirt, and a 0.0007 inch tolerance due to the plating process, all of which contributes to greater noise and blow by gas generated as the piston 10 moves within the engine cylinder. In the illustrated method, where the coating is done before the machining, the tolerance due to the coating process is eliminated since the coating is machined, thus reducing the noise created by the engine. To reduce this tolerance in the plated piston, an additional machining step after plating is required, increasing the cost of the piston.

Various features of the invention are set forth in the following claims.

We claim:

1. A piston for use in an engine, the piston comprising:

a piston head, the piston head including at least one ring groove;

a piston skirt coated with a first thickness of a bronze coating material;

a side panel adjacent the piston skirt, the side panel coated with a second thickness of the bronze coating material; and a land adjacent to the side panel;

wherein the first and second thicknesses of bronze coating material are different.

2. The piston of claim 1, wherein the bronze coating material also includes aluminum.

3. The piston of claim 2, wherein the aluminum comprises at least about seven percent and less than or equal to about thirty percent of the bronze material.

4. The piston of claim 3, wherein the aluminum comprises about fourteen percent of the coating material.

5. The piston of claim 1, wherein the bronze coating material also includes manganese.

6. The piston of claim 1, wherein the bronze coating material also includes silicon.

7. The piston of claim 1, wherein the bronze coating material also includes zinc.

8. The piston of claim 1, wherein the first thickness of bronze coating material is greater than or equal to 0.002 inches and less than or equal to 0.030 inches.

9. The piston of claim 8, wherein the first thickness of bronze coating material is between 0.022 inches and 0.025 inches.

10. The piston of claim 1, wherein the first thickness of bronze coating material is greater than or equal to 0.002 inches and less than or equal to 0.030 inches, and wherein the second thickness of bronze coating material is greater than or equal to 0 and less than or equal to 0.028 inches.

11. The piston of claim 1, wherein the first thickness of the bronze coating material on the skirt is greater than the second thickness.

12. The piston of claim 1, wherein the second thickness of bronze coating material is greater than or equal to 0 and less than or equal to 0.028 inches.

13. The piston of claim 1, wherein the second thickness on the side panel is a uniform thickness.

14. The piston of claim 1, wherein the second thickness on the side panel is a non-uniform thickness.

15. A method of making a piston comprising:

forming a piston blank having a piston head, a piston skirt, and a side panel, the piston skirt having a smaller diameter than the piston head;

applying a coating material to the piston skirt;

machining the piston blank only after the coating is applied such that the diameter of the piston skirt after machining is greater than or equal to the diameter of the piston head after machining; and wherein the piston machining step includes creating ring grooves in the piston head, and includes removing any coating material from the piston head.

16. The method of claim 15, further comprising grit blasting the piston before applying the coating.

17. The method of claim 15, wherein the coating applying step includes applying a coating of a material containing bronze.

18. The method of claim 17, wherein the step of applying a coating includes applying a coating between 0.002 inches and 0.030 inches thick.

19. The method of claim 15, wherein the coating applying step includes applying a coating between 0.002 inches and 0.030 inches thick to the piston skirt, and applying a coating between 0 and 0.028 inches thick to the side panel.

20. The method of claim 15, wherein the coating applying step includes applying less coating on the side panel than on the piston skirt.

21. The method of claim 20, wherein the step of applying less coating on the side panel includes applying a coating thickness greater than or equal to 0 and less than or equal to 0.028 inches.

22. The method of claim 20, further comprising masking the side panel before applying the coating on the side panel.

23. The method of claim 20, wherein coating applying step includes using a spray gun to apply the coating, and moving at least one of the piston and the spray gun during application of the coating.

24. The method of claim 23, wherein the coating applying step includes rotating the piston, and further includes rotating the piston at a higher rate when the spray gun is adjacent to the side panel.

25. The method of claim 23, wherein the coating applying step includes moving the spray apparatus and keeping the piston stationary.

26. A piston comprising:

a piston head, the piston head including at least one ring groove;

a piston skirt having a bronze coating material thereon;

a side panel adjacent the piston skirt, the side panel having the bronze coating material thereon; and a land adjacent to the side panel having no bronze coating material thereon.

27. The piston of claim 26, wherein the side panel includes coating material of a different thickness than the thickness of the coating material on the piston skirt.

28. The piston of claim 27, wherein the thickness of coating material on the side panel is a non-uniform thickness.

29. The piston of claim 26, wherein the coating material also includes aluminum.

30. The piston of claim 26, wherein the bronze material also includes at least seven percent aluminum and less than or equal to thirty percent aluminum.

31. The piston of claim 30, wherein the bronze material includes about fourteen percent aluminum.

32. The piston of claim 26, wherein the piston head includes no coating material.

33. The piston of claim 26, wherein the piston skirt includes coating material having a first thickness, and wherein the side panel includes coating material thereon having a second thickness such that the first and second thicknesses are different.

34. The piston of claim 33, wherein the first thickness of bronze coating material is greater than or equal to 0.002 inches and less than or equal to 0.030 inches.

35. The piston of claim 34, wherein the first thickness of bronze coating material is between about 0.022 inches and 0.025 inches.

36. The piston of claim 33, wherein the first thickness of the coating on the skirt is greater than the second thickness on the side panel.

37. The piston of claim 33, wherein the second thickness of bronze coating material is greater than or equal to 0 and less than or equal to 0.028 inches.

38. The piston of claim 33, wherein the first thickness of bronze coating material is greater than or equal to 0.002 inches and less than or equal to 0.030 inches, and wherein the second thickness of bronze coating material is greater than or equal to 0 and less than or equal to 0.028 inches.

39. A piston comprising:

a piston head, the piston head including at least one ring groove;

a piston skirt coated with a first thickness of a bronze coating material;

a side panel adjacent the piston skirt, the side panel coated with a second thickness of the coating material, the side panel having an aperture therein to receive a connecting pin;

a land adjacent to the side panel; and at least one pin boss disposed radially inwardly of the side panel;

wherein the first and second thicknesses of bronze coating material are different.

40. The piston of claim 39, wherein the bronze coating material also includes aluminum.

41. The piston of claim 39, wherein the bronze coating material also includes at least seven percent aluminum and less than or equal to thirty percent aluminum.

42. The piston of claim 41, wherein the bronze coating material also includes about fourteen percent aluminum.

43. The piston of claim 39, wherein the first thickness of bronze coating material is greater than or equal to 0.002 inches and less than or equal to 0.030 inches.

44. The piston of claim 43, wherein the first thickness of bronze coating material is between about 0.022 inches and 0.025 inches.

45. The piston of claim 39, wherein the first thickness of the coating on the skirt is greater than the second thickness on the side panel.

46. The piston of claim 39, wherein the second thickness of bronze coating material is greater than or equal to 0 and less than or equal to 0.028 inches.

47. The piston of claim 39, wherein the first thickness of bronze coating material is greater than or equal to 0.002 inches and less than or equal to 0.030 inches, and wherein the second thickness of bronze coating material is greater than or equal to 0 and less than or equal to 0.028 inches.

48. The piston of claim 39, wherein the second thickness on the side panel is a uniform thickness.

49. The piston of claim 39, wherein the second thickness on the side panel is a non-uniform thickness.

50. A piston for use in an engine, the piston comprising:

a piston skirt coated with a bronze coating material;

a side panel adjacent the piston skirt, the side panel coated with the bronze coating material;

a land adjacent to the side panel; and a piston head including at least one ring groove, the piston head including no bronze coating material.

51. The piston of claim 50, wherein the bronze coating material also includes aluminum.

52. The piston of claim 51, wherein the bronze coating material also includes at least about seven percent aluminum and less than or equal to about thirty percent aluminum.

53. The piston of claim 52, wherein the bronze coating material includes about fourteen percent aluminum.

54. The piston of claim 50, wherein the piston skirt includes a bronze coating of a first thickness, and wherein the side panel includes a bronze coating of a second thickness such that the first and second thicknesses are different.

55. The piston of claim 54, wherein the first thickness of bronze coating material is greater than or equal to 0.002 inches and less than or equal to 0.030 inches.

56. The piston of claim 55, wherein the first thickness of bronze coating material is between about 0.022 inches and 0.025 inches.

57. The piston of claim 54, wherein the first thickness of bronze coating material on the skirt is greater than the second thickness on the side panel.

58. The piston of claim 54, wherein the second thickness of bronze coating material is greater than or equal to 0 and less than or equal to 0.028 inches.

59. The piston of claim 54, wherein the first thickness of bronze coating material is greater than or equal to 0.002 inches and less than or equal to 0.030 inches, and wherein the second thickness of bronze coating material is greater than or equal to 0 and less than or equal to 0.028 inches.

60. The piston of claim 54, wherein the second thickness on the side panel is a uniform thickness.

61. The piston of claim 54, wherein the second thickness on the side panel is a non-uniform thickness.

* * * * *